United States Patent
Johnsen et al.

(10) Patent No.: US 11,271,870 B2
(45) Date of Patent: Mar. 8, 2022

(54) SYSTEM AND METHOD FOR SUPPORTING SCALABLE BIT MAP BASED P_KEY TABLE IN A HIGH PERFORMANCE COMPUTING ENVIRONMENT

(71) Applicant: Oracle International Corporation, Redwood Shores, CA (US)

(72) Inventors: Bjørn Dag Johnsen, Oslo (NO); Arvind Srinivasan, San Jose, CA (US); Line Holen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/412,972

(22) Filed: Jan. 23, 2017

(65) Prior Publication Data
US 2017/0214636 A1 Jul. 27, 2017

Related U.S. Application Data

(60) Provisional application No. 62/287,704, filed on Jan. 27, 2016.

(51) Int. Cl.
*H04L 12/947* (2013.01)
*H04L 12/931* (2013.01)
(Continued)

(52) U.S. Cl.
CPC .............. *H04L 49/25* (2013.01); *G06F 9/451* (2018.02); *G06F 9/45558* (2013.01);
(Continued)

(58) Field of Classification Search
CPC ....... H04L 49/358; H04L 49/15; H04L 49/30; H04L 49/70; H04L 49/10; H04L 49/25;
(Continued)

(56) References Cited

U.S. PATENT DOCUMENTS 6,286,038 B1  9/2001  Reichmeyer et al.
6,694,361 B1  2/2004  Shah et al.
(Continued)

FOREIGN PATENT DOCUMENTS

CN  1400785  3/2003
CN  1520556  8/2004
(Continued)

OTHER PUBLICATIONS

European Patent Office, International Searching Authority, International Search Report and Written Opinion dated Apr. 5, 2017 For International Application No. PCT/US2017/015156, 13 pages.
(Continued)

*Primary Examiner* — Jianye Wu

(74) *Attorney, Agent, or Firm* — Tucker Ellis LLP

(57) ABSTRACT

System and method for supporting scalable bitmap based P_Key table in a high performance computing environment. A method can provide, at least one subnet comprising one or more switches, a plurality of host channel adapters, and a plurality of end nodes. The method can associate the plurality of end nodes with at least one of a plurality of partitions, wherein each of the plurality of partitions are associated with a P_Key value. The method can associate each of the one or more switches with a bitmap based P_Key table of a plurality of bitmap based P_Key tables. The method can associate each of the host channel adapters with a bitmap based P_Key table of the plurality of bitmap based P_Key tables.

20 Claims, 14 Drawing Sheets

(51) Int. Cl.
| | |
|---|---|
| *H04L 12/753* | (2013.01) |
| *G06F 9/451* | (2018.01) |
| *G06F 16/22* | (2019.01) |
| *G06F 9/455* | (2018.01) |
| *H04L 12/44* | (2006.01) |
| *H04L 12/26* | (2006.01) |
| *H04L 12/751* | (2013.01) |
| *H04L 12/933* | (2013.01) |
| *H04L 12/935* | (2013.01) |
| *H04L 29/06* | (2006.01) |
| *H04L 29/08* | (2006.01) |
| *H04L 49/25* | (2022.01) |
| *H04L 49/356* | (2022.01) |
| *H04L 45/48* | (2022.01) |
| *H04L 41/046* | (2022.01) |
| *H04L 41/0803* | (2022.01) |
| *H04L 41/14* | (2022.01) |
| *H04L 43/0823* | (2022.01) |
| *H04L 43/0882* | (2022.01) |
| *H04L 45/02* | (2022.01) |
| *H04L 49/10* | (2022.01) |
| *H04L 49/15* | (2022.01) |
| *H04L 49/00* | (2022.01) |
| *H04L 67/10* | (2022.01) |
| *H04L 67/1097* | (2022.01) |
| *H04L 41/12* | (2022.01) |

(52) U.S. Cl.
CPC .......... *G06F 16/2237* (2019.01); *H04L 12/44* (2013.01); *H04L 41/046* (2013.01); *H04L 41/0803* (2013.01); *H04L 41/14* (2013.01); *H04L 43/0823* (2013.01); *H04L 43/0882* (2013.01); *H04L 45/02* (2013.01); *H04L 45/48* (2013.01); *H04L 49/10* (2013.01); *H04L 49/15* (2013.01); *H04L 49/30* (2013.01); *H04L 49/358* (2013.01); *H04L 49/70* (2013.01); *H04L 63/20* (2013.01); *H04L 67/10* (2013.01); *H04L 67/1097* (2013.01); *G06F 2009/45579* (2013.01); *G06F 2009/45595* (2013.01); *H04L 41/12* (2013.01)

(58) Field of Classification Search
CPC ..... H04L 67/10; H04L 67/1097; H04L 12/44; H04L 41/046; H04L 41/12; H04L 41/0803; H04L 41/14; H04L 43/0823; H04L 43/0882; H04L 45/02; H04L 63/20; H04L 45/48; H04L 43/00823; G06F 9/451; G06F 9/45558; G06F 17/30324; G06F 2009/45579; G06F 2009/45595; G06F 16/2237
See application file for complete search history.

(56) References Cited

U.S. PATENT DOCUMENTS

| | | | |
|---|---|---|---|
| 7,136,907 B1 | 11/2006 | Nordstrom et al. | |
| 7,200,704 B2 | 4/2007 | Njoku et al. | |
| 7,272,643 B1 | 9/2007 | Sarkar et al. | |
| 7,472,422 B1 | 12/2008 | Agbabian | |
| 7,543,046 B1 | 6/2009 | Bae et al. | |
| 7,574,526 B2 | 8/2009 | Kashyap et al. | |
| 7,639,616 B1 | 12/2009 | Manula et al. | |
| 7,724,678 B1 | 5/2010 | Johnsen et al. | |
| 7,860,941 B1 | 12/2010 | Wilson | |
| 7,949,721 B2 | 5/2011 | Burrow et al. | |
| 7,962,562 B1 | 6/2011 | Budhia et al. | |
| 8,009,589 B2 | 8/2011 | Burrow et al. | |
| 8,331,381 B2 | 12/2012 | Brown et al. | |
| 8,661,499 B2 | 2/2014 | Natarajan et al. | |
| 8,855,992 B1 | 10/2014 | Li et al. | |
| 8,862,702 B2 | 10/2014 | Robitaille et al. | |
| 8,908,704 B2 | 12/2014 | Koren et al. | |
| 8,935,333 B2 | 1/2015 | Beukema et al. | |
| 8,953,486 B2 | 2/2015 | Klessig et al. | |
| 9,172,611 B2 | 10/2015 | Guruswamy | |
| 9,331,936 B2 | 5/2016 | Ayoub | |
| 9,379,971 B2 | 6/2016 | Sem-Jacobson et al. | |
| 9,418,040 B2 | 8/2016 | Cordray et al. | |
| 9,548,896 B2 | 1/2017 | Naiksatam et al. | |
| 9,641,439 B2 | 5/2017 | Onoue | |
| 9,647,882 B1 | 5/2017 | Whittaker | |
| 9,647,909 B2 | 5/2017 | Kuan et al. | |
| 9,655,232 B2 | 5/2017 | Saxena et al. | |
| 9,686,179 B2 | 6/2017 | Tatsumi | |
| 9,712,334 B2 | 7/2017 | Jain | |
| 9,716,628 B2 | 7/2017 | Sikand et al. | |
| 9,774,401 B1 | 9/2017 | Borrill | |
| 9,806,994 B2 | 10/2017 | Haramaty et al. | |
| 9,819,505 B2 | 11/2017 | Bhat et al. | |
| 9,825,776 B2 | 11/2017 | Calciu et al. | |
| 9,825,814 B2 | 11/2017 | Mekkattuparamban et al. | |
| 9,832,066 B2 | 11/2017 | Zhou et al. | |
| 9,838,315 B2 | 12/2017 | Kapadia et al. | |
| 9,858,104 B2 | 1/2018 | Tripathi et al. | |
| 9,871,676 B2 | 1/2018 | Venkatesh | |
| 9,876,715 B2 | 1/2018 | Edsall et al. | |
| 9,882,643 B2 | 1/2018 | Braun | |
| 9,893,940 B1 | 2/2018 | Chawla et al. | |
| 9,893,989 B2 | 2/2018 | Ayandeh | |
| 9,900,224 B2 | 2/2018 | Dumitriu et al. | |
| 9,917,736 B2 | 3/2018 | Jubran et al. | |
| 9,923,780 B2 | 3/2018 | Rao et al. | |
| 9,923,837 B2 | 3/2018 | Zhang et al. | |
| 9,973,435 B2 | 5/2018 | Haramaty et al. | |
| 9,979,595 B2 | 5/2018 | Choudhury et al. | |
| 9,998,356 B2 | 6/2018 | Moreno et al. | |
| 10,038,601 B1 | 7/2018 | Becker et al. | |
| 10,044,525 B2 | 8/2018 | Gaddehosur et al. | |
| 10,050,842 B2 | 8/2018 | Salam et al. | |
| 10,055,240 B2 | 8/2018 | Chastain et al. | |
| 10,063,473 B2 | 8/2018 | Wenig | |
| 10,083,062 B2 | 9/2018 | Kuik et al. | |
| 10,085,124 B2 | 9/2018 | Patel et al. | |
| 10,097,417 B2 | 10/2018 | Pietrowicz et al. | |
| 10,103,939 B2 | 10/2018 | Koponen et al. | |
| 10,142,353 B2 | 11/2018 | Yadav et al. | |
| 10,229,087 B2 | 3/2019 | Sun et al. | |
| 10,270,687 B2 | 4/2019 | Mithyantha | |
| 10,284,383 B2 | 5/2019 | Bloch et al. | |
| 10,313,272 B2 | 6/2019 | Moxnes et al. | |
| 10,360,205 B2 | 7/2019 | Friedman et al. | |
| 10,447,710 B1 | 10/2019 | Li et al. | |
| 10,498,654 B2 | 12/2019 | Shalev et al. | |
| 10,575,339 B2 | 2/2020 | Segal et al. | |
| 10,587,509 B2 | 3/2020 | Ramanujan et al. | |
| 10,728,149 B1 | 7/2020 | Ramanujan et al. | |
| 2002/0141427 A1 | 10/2002 | McAlpine | |
| 2003/0005039 A1 | 1/2003 | Craddock et al. | |
| 2003/0208572 A1 | 11/2003 | Shah et al. | |
| 2004/0003137 A1 | 1/2004 | Callender et al. | |
| 2004/0024905 A1 | 2/2004 | Liao et al. | |
| 2004/0024911 A1 | 2/2004 | Chung et al. | |
| 2004/0030763 A1 | 2/2004 | Manter et al. | |
| 2004/0047294 A1 | 3/2004 | Ain et al. | |
| 2004/0059806 A1 | 3/2004 | Webb | |
| 2004/0114531 A1 | 6/2004 | Tucker et al. | |
| 2004/0153849 A1 | 8/2004 | Tucker et al. | |
| 2004/0190546 A1 | 9/2004 | Jackson | |
| 2005/0060445 A1 | 3/2005 | Beukema et al. | |
| 2005/0071473 A1 | 3/2005 | Rosenstock et al. | |
| 2005/0071709 A1 | 3/2005 | Rosenstock et al. | |
| 2005/0108362 A1 | 5/2005 | Weinert et al. | |
| 2005/0271074 A1 | 12/2005 | Johnsen et al. | |
| 2005/0273650 A1* | 12/2005 | Tsou | G06F 11/1456 714/6.12 |
| 2005/0286511 A1* | 12/2005 | Johnsen | H04L 63/126 370/389 |

(56) References Cited

U.S. PATENT DOCUMENTS

| | | | |
|---|---|---|---|
| 2006/0064582 | A1 | 3/2006 | Teal et al. |
| 2006/0230119 | A1 | 10/2006 | Hausauer et al. |
| 2006/0230219 | A1 | 10/2006 | Njoku et al. |
| 2007/0165672 | A1 | 7/2007 | Keels et al. |
| 2007/0192437 | A1 | 8/2007 | Wang et al. |
| 2007/0208820 | A1 | 9/2007 | Makhervaks et al. |
| 2007/0223483 | A1 | 9/2007 | Huang et al. |
| 2009/0141734 | A1 | 6/2009 | Brown et al. |
| 2009/0216853 | A1 | 8/2009 | Burrow et al. |
| 2009/0254722 | A1 | 10/2009 | Kobashi |
| 2009/0257514 | A1 | 10/2009 | Connolly et al. |
| 2010/0138532 | A1 | 6/2010 | Glaeser et al. |
| 2012/0311143 | A1 | 12/2012 | Johnsen et al. |
| 2013/0121154 | A1 | 5/2013 | Guay et al. |
| 2013/0286824 | A1 | 10/2013 | Rangaprasad et al. |
| 2014/0064287 | A1 | 3/2014 | Bogdanski et al. |
| 2014/0122761 | A1 | 5/2014 | Nagendra et al. |
| 2014/0185615 | A1 | 7/2014 | Ayoub |
| 2014/0229945 | A1 | 8/2014 | Barkai et al. |
| 2014/0362709 | A1 | 12/2014 | Kashyap et al. |
| 2015/0229715 | A1 | 8/2015 | Sankar et al. |
| 2015/0254451 | A1 | 9/2015 | Doane et al. |
| 2015/0295818 | A1 | 10/2015 | Hayashitani et al. |
| 2015/0338909 | A1 | 11/2015 | Woodruff |
| 2016/0006583 | A1 | 1/2016 | Takashima et al. |
| 2016/0007102 | A1 | 1/2016 | Raza et al. |
| 2016/0077935 | A1 | 3/2016 | Zheng et al. |
| 2016/0080266 | A1 | 3/2016 | Fujii et al. |
| 2016/0119256 | A1 | 4/2016 | Wang et al. |
| 2016/0315964 | A1 | 10/2016 | Shetty et al. |
| 2017/0085422 | A1 | 3/2017 | Chapman |
| 2017/0104817 | A1* | 4/2017 | Zahid ............... H04L 47/125 |
| 2017/0134211 | A1 | 5/2017 | Yoon Lee et al. |
| 2017/0180240 | A1 | 6/2017 | Kern et al. |
| 2017/0214580 | A1 | 7/2017 | Moxnes et al. |
| 2017/0237601 | A1 | 8/2017 | Zhu et al. |

FOREIGN PATENT DOCUMENTS

| | | |
|---|---|---|
| CN | 104115121 | 10/2014 |
| CN | 104205778 | 12/2014 |
| CN | 104407911 | 3/2015 |
| EP | 3107248 | 12/2016 |
| JP | H10-56464 | 2/1998 |
| JP | 2005354299 | 12/2005 |
| JP | 2015503274 | 1/2015 |
| WO | 2005043842 | 5/2005 |

OTHER PUBLICATIONS

Abhinav Vishu et al., "Performance Modeling of Subnet Management on Fat Tree InfiniBand Networks Using OpenSM", Proceedings of the 19th IEEE International Parallel and Distributed Processing Symposium (IPDPS'05), Apr. 8, 2005, 8 pages.

Francesco Fusco et al., "Real-time creation of bitmap indexes on streaming network data", The VLDB Journal (2012) 21:287-307.

Feroz Zahid et al., "Partition-aware routing to improve network isolation in InfiniBand based multi-tenant clusters", 2015 15th IEEE/ACM International Symposium on Cluster, Cloud and Grid Computing, May 1, 2015, pp. 189-198.

International Search Report and the Written Opinion of the Searching Authority dated Apr. 5, 2017, for PCT Application No. PCT/US2017/014963, 11 pages.

"Mellanox IB DDR Auto-negotiation Protocol", Mellanox Technologies, Rev 1.0, May 7, 2009, 20 pages.

United States Patent and Trademark Office, Office Action dated Mar. 8, 2018 for U.S. Appl. No. 15/412,995, 13 pages.

United States Patent and Trademark Office, Office Action dated Mar. 8, 2018 for U.S. Appl. No. 15/413,075, 10 pages.

United States Patent and Trademark Office, Office Action dated Apr. 11, 2018 for U.S. Appl. No. 15/412,985, 12 pages.

United States Patent and Trademark Office, Office Action dated Dec. 27, 2018 for U.S. Appl. No. 15/416,899, 12 pages.

United States Patent and Trademark Office, Office Action dated Jan. 24, 2019 for U.S. Appl. No. 15/414,173, 8 pages.

United States Patent and Trademark Office, Office Action dated Feb. 15, 2019 for U.S. Appl. No. 15/416,908, 17 pages.

United States Patent and Trademark Office, Office Action dated Feb. 21, 2019 for U.S. Appl. No. 15/412,995, 9 pages.

United States Patent and Trademark Office, Office Action dated Mar. 28, 2019 for U.S. Appl. No. 15/415,497, 23 pages.

United States Patent and Trademark Office, Office Action dated Nov. 22, 2019 for U.S. Appl. No. 15/415,497, 27 pages.

United States Patent and Trademark Office, Office Action dated Aug. 7, 2019 for U.S. Appl. No. 15/412,995, 9 pages.

United States Patent and Trademark Office, Notice of Allowance and Fee(s) due dated Oct. 28, 2019 for U.S. Appl. No. 15/412,995, 7 pages.

European Patent Office, Communication Pursuant to Article 94(3) EPC dated Aug. 9, 2019 for International Application No. 17705998.7 , 4 pages.

European Patent Office, Communication Pursuant to Article 94(3) EPC dated Aug. 9, 2019 for International Application No. 17705514.2 , 5 pages.

Indian Patent Office, First Examination Report dated Jan. 29, 2020 for Indian Patent Application No. 201747042482, 7 pages.

United States Patent and Trademark Office, Notice of Allowance dated Feb. 11, 2020 for U.S. Appl. No. 15/416,908, 9 pages.

Chinese Patent Office, Office Action dated Mar. 4, 2020 for Chinese Patent Application No. 201780002356.0, 6 pages.

United States Patent and Trademark Office, Office Action dated Mar. 5, 2020 for U.S. Appl. No. 16/262,640, 18 pages.

Chinese Patent Office, Office Action dated Mar. 16, 2020 for Chinese Patent Application No. 201780002357.5, 11 pages.

Indian Patent Office, First Examination Report dated May 14, 2020 for Indian Patent Application No. 201747042481, 7 pages.

United States Patent and Trademark Office, Office Action dated May 19, 2020 for U.S. Appl. No. 15/415,497, 26 pages.

United States Patent and Trademark Office, Office Action dated Jun. 1, 2020 for U.S. Appl. No. 16/399,191, 7 pages.

United States Patent and Trademark Office, Office Action dated Jun. 9, 2020 for U.S. Appl. No. 16/558,974, 11 pages.

European Patent Office, Communication pursuant to Article 94(3) EPC dated Jun. 10, 2020 for EP Application No. 17705998.7, 4 pages.

United States Patent and Trademark Office, Notice of Allowance dated Jul. 10, 2020 for U.S. Appl. No. 16/262,640, 6 pages.

United States Patent and Trademark Office, Notice of Allowance dated Aug. 12, 2020 for U.S. Appl. No. 16/399,191, 8 pages.

Nakamura, Minoru; "Basic Idea Required for InfiniBand Program", published May 11, 2014, retrieved from http://www.nminoru.jp/~nminoru/network/infiniband/iba-concept.html, 27 pages.

Japanese Patent Office, Office Action dated Nov. 17, 2020 for Japanese Patent Application No. 2018-504729, 6 pages.

United States Patent and Trademark Office, Notice of Allowance dated Nov. 23, 2020 for U.S. Appl. No. 16/558,974, 8 pages.

Japanese Patent Office, Office Action dated Dec. 1, 2020 for Japanese Patent Application No. 2018-504731, 5 pages.

United States Patent and Trademark Office, Office Action dated Dec. 10, 2020 for U.S. Appl. No. 16/779,022, 12 pages.

Chinese Patent Office, Office Action dated Jan. 12, 2021 for Chinese Patent Application No. 201780002356.0, 4 pages.

United States Patent and Trademark Office, Office Action dated Feb. 5, 2020 for U.S. Appl. No. 15/415,497, 29 pages.

Chinese Patent Office, Notification to Grant Patent Right dated Mar. 19, 2021 for Chinese Patent Application No. 201780002356.0, 6 pages.

United States Patent and Trademark Office, Notice of Allowance dated Mar. 26, 2021 for U.S. Appl. No. 16/779,022, 11 pages.

United States Patent and Trademark Office, Notice of Allowance dated Jun. 22, 2021 for U.S. Appl. No. 15/415,497 , 49 pages.

Karen Works et al., "Optimizing adaptive multi-route query processing via time-partitioned indices", Journal of Computer and System Sciences 79 (2013), © 2012 Elsevier, pp. 330-348.

(56) References Cited

OTHER PUBLICATIONS

Japanese Patent Office, Decision of Refusal dated Jun. 28, 2021 for Japanese Patent Application No. 2018-504731, 8 pages.

* cited by examiner

SYSTEM AND METHOD FOR SUPPORTING SCALABLE BIT MAP BASED P_KEY TABLE IN A HIGH PERFORMANCE COMPUTING ENVIRONMENT

CLAIM OF PRIORITY

This application claims the benefit of priority to U.S. Provisional Patent Application entitled "SYSTEM AND METHOD FOR PROVIDING SCALALBE BIT MAP BASED P_KEY TABLE IN A COMPUTING ENVIRONMENT", Application No. 62/287,704, filed on Jan. 27, 2016 which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting a scalable bit map based P_Key table in a high performance computing environment.

BACKGROUND

As larger cloud computing architectures are introduced, the performance and administrative bottlenecks associated with the traditional network and storage have become a significant problem. There has been an increased interest in using high performance lossless interconnects such as Infini-Band (IB) technology as the foundation for a cloud computing fabric. This is the general area that embodiments of the invention are intended to address.

SUMMARY

Described herein are systems and methods for supporting a scalable bit map based P_Key table in a high performance computing environment. An exemplary method can provide, at one or more computers, including one or more microprocessors at least one subnet, the at least one subnet comprising one or more switches, the one or more switches comprising at least a leaf switch, wherein each of the one or more switches comprise a plurality of switch ports, a plurality of host channel adapters, each host channel adapter comprising at least one host channel adapter port, and a plurality of end nodes, wherein each of the plurality of end nodes are associated with at least one host channel adapter of the plurality of host channel adapters. The method can associate each of the plurality of end nodes with at least one of a plurality of partitions, wherein each of the plurality of partitions are associated with a P_Key value. The method can associate each of the one or more switch ports with a bitmap based P_Key table of a plurality of bitmap based P_Key tables. The method can associate each of the host channel adapter ports with a bitmap based P_Key table of the plurality of bitmap based P_Key tables.

In accordance with an embodiment, one or more of the plurality of host channel adapters can comprise at least one virtual function, at least one virtual switch, and at least one physical function. The plurality of end nodes can comprise physical hosts, virtual machines, or a combination of physical hosts and virtual machines, wherein the virtual machines are associated with at least one virtual function.

DETAILED DESCRIPTION

Figure 1:
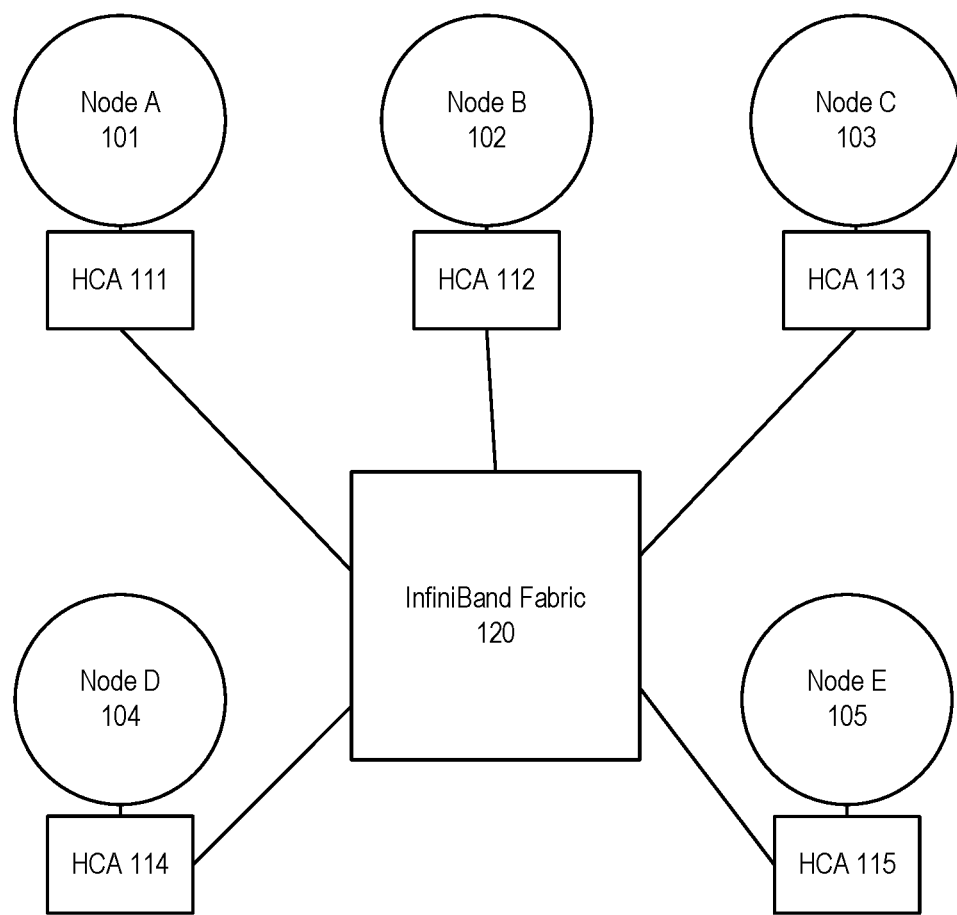
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods to support a scalable bitmap based P_Key table in a high performance computing environment.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
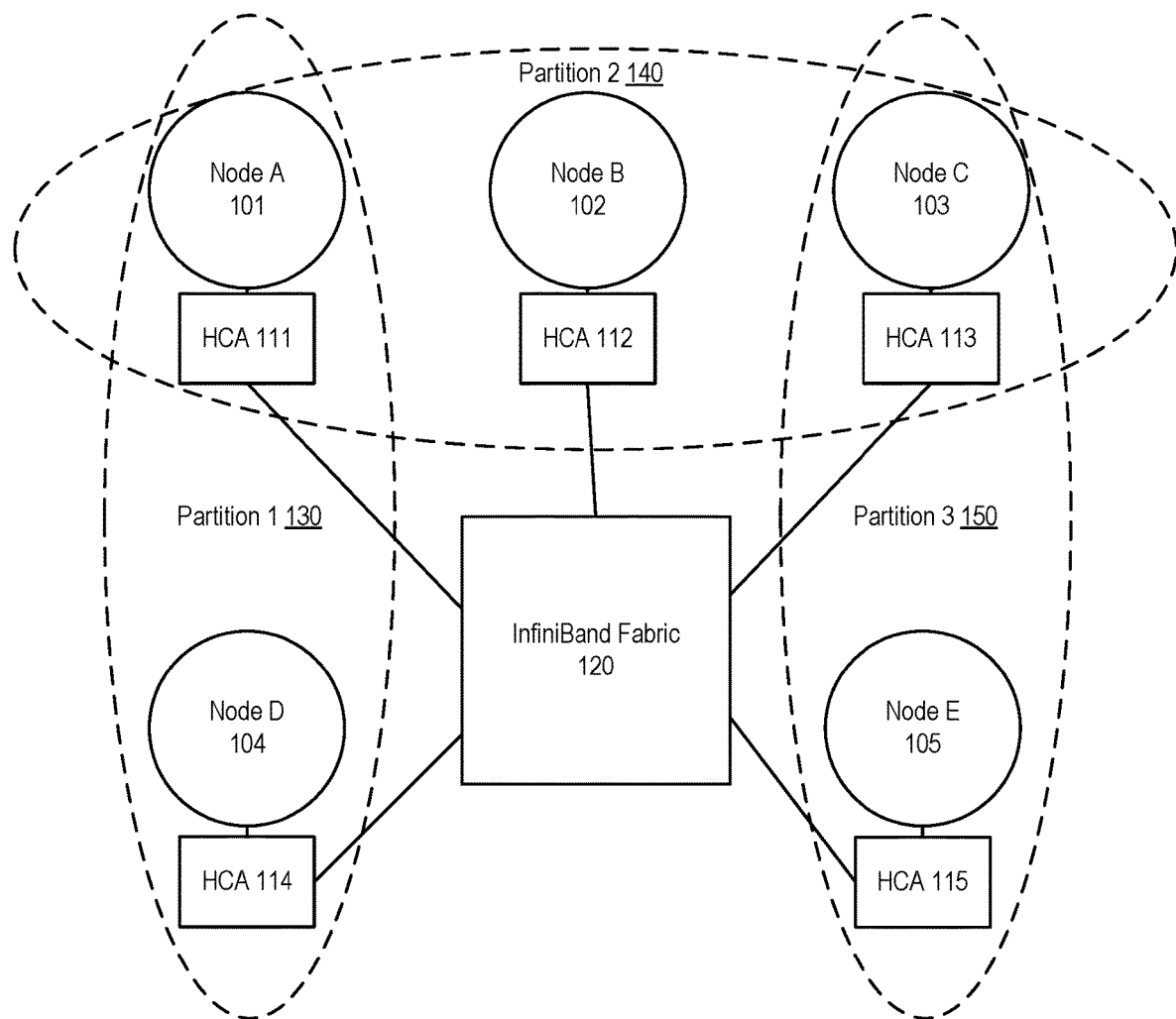
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topolodies and Routind

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
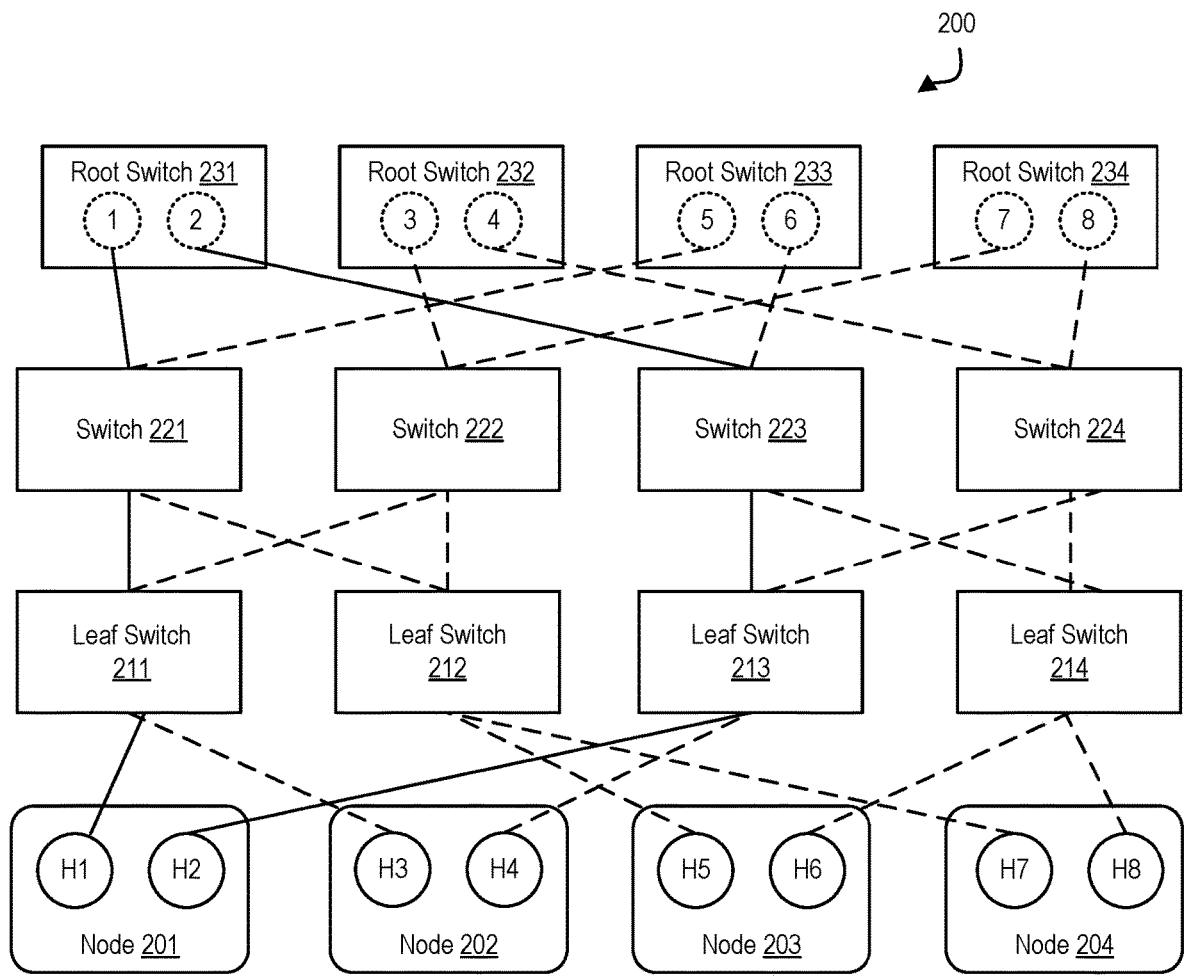
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2 k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. Wth the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
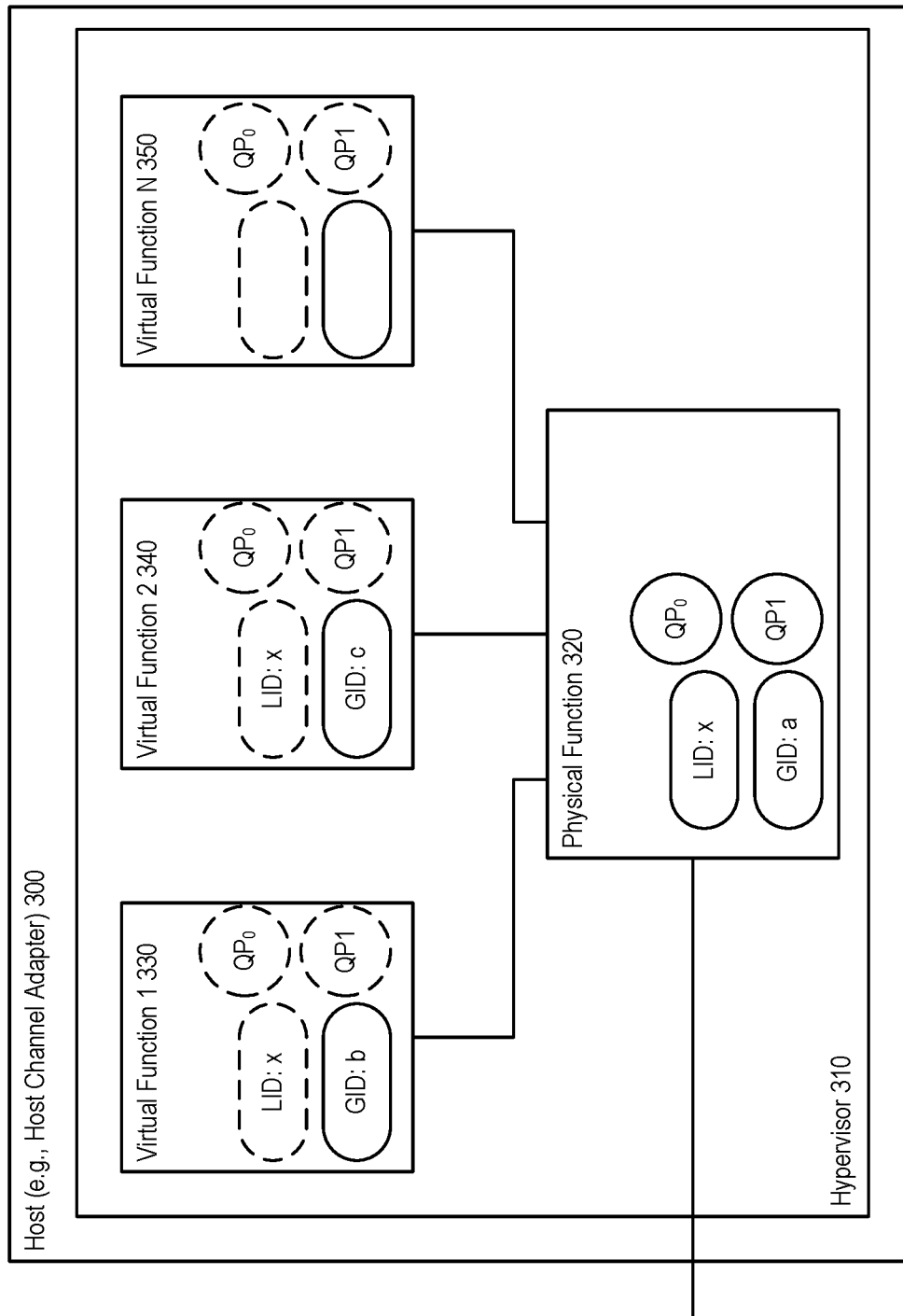
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
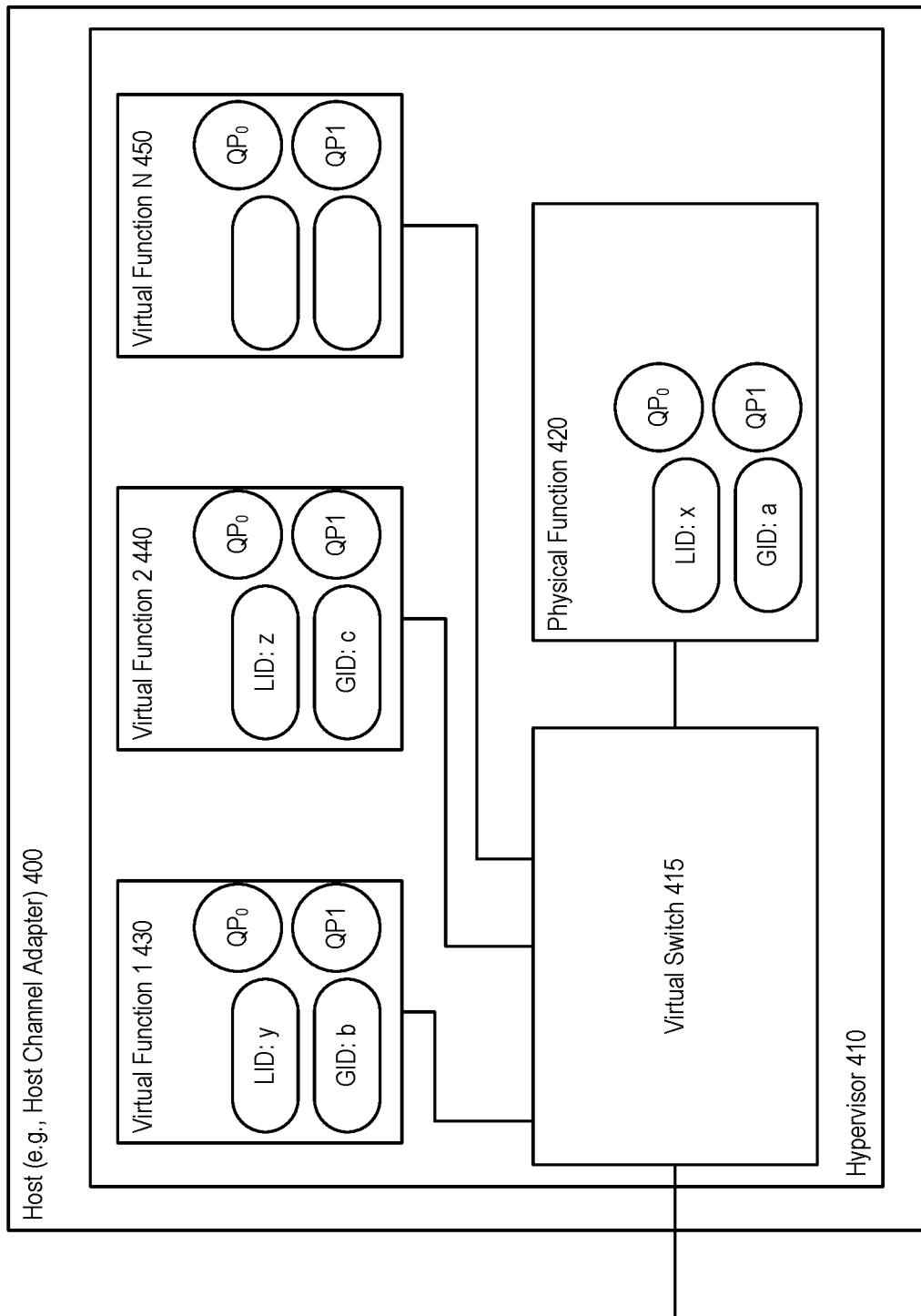
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
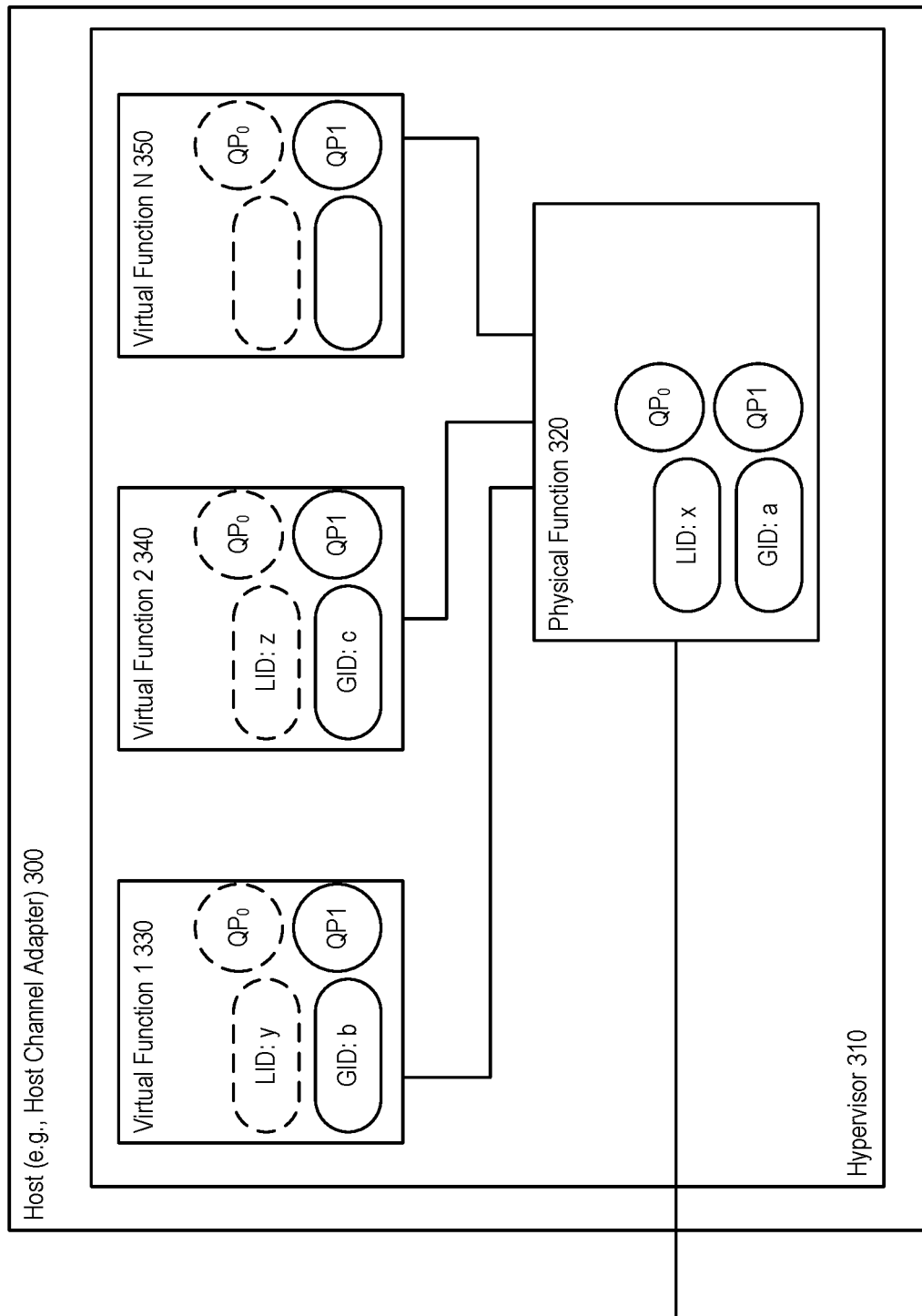
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. Wth the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
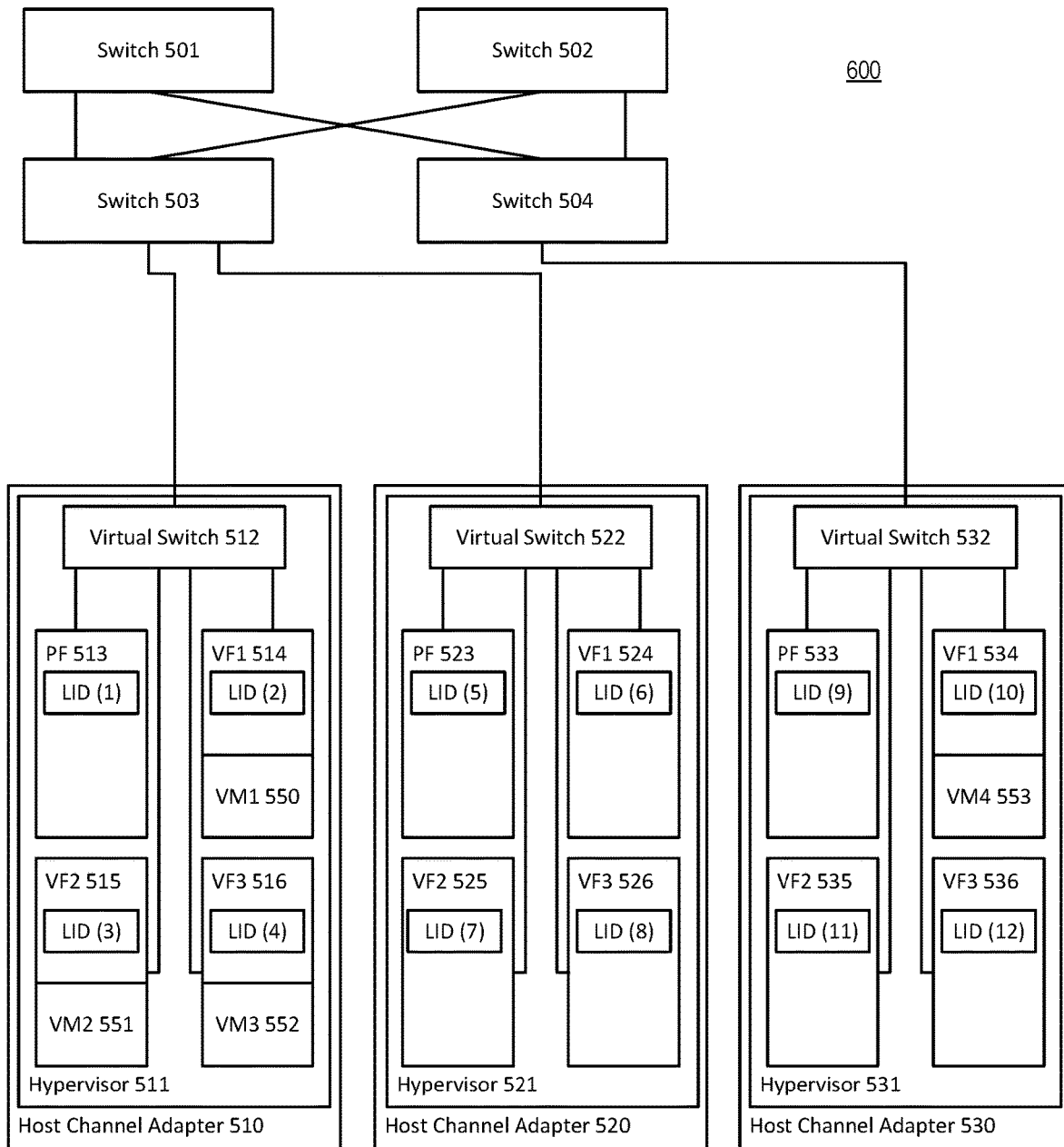
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516.

Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LI Ds are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
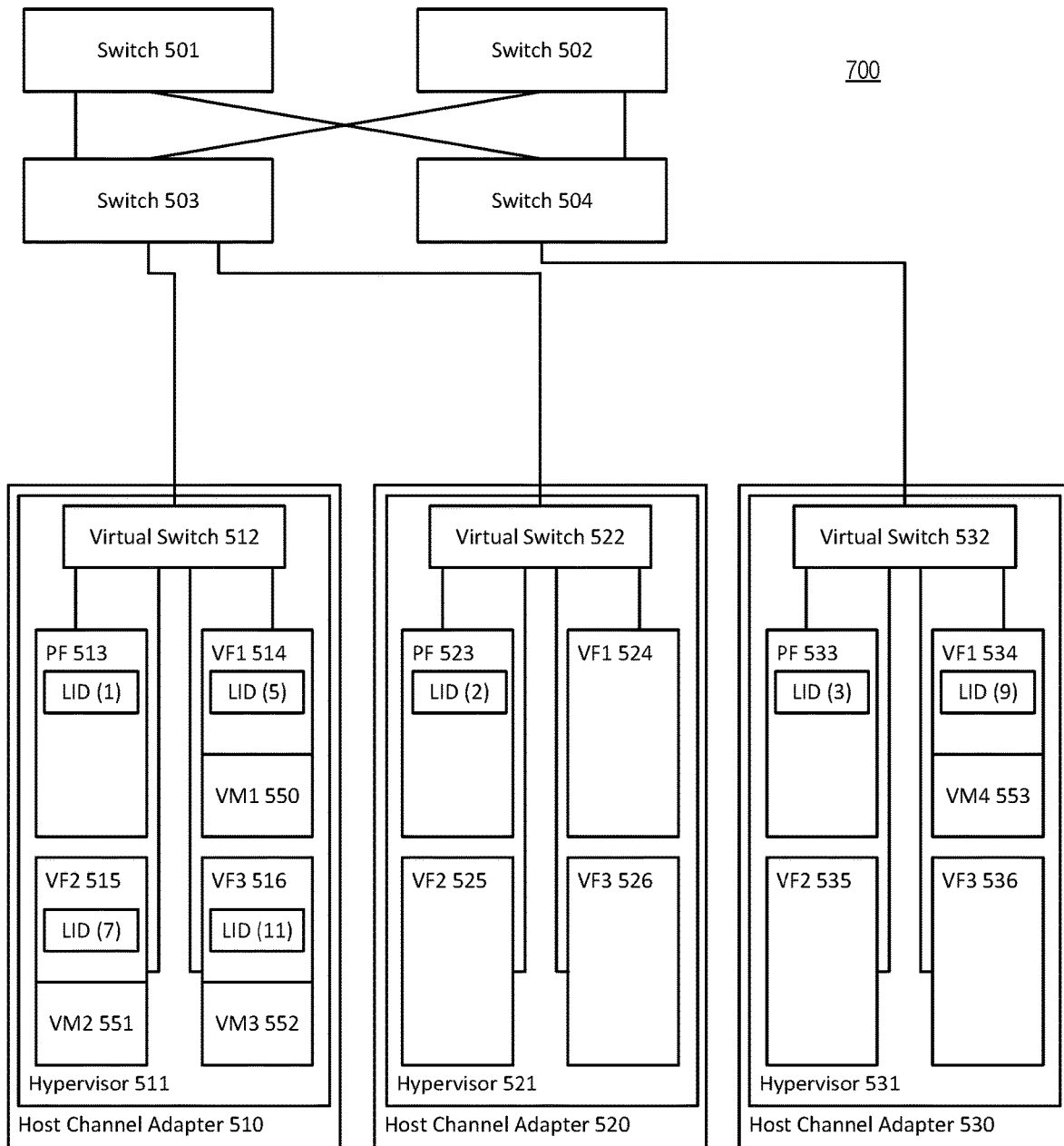
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
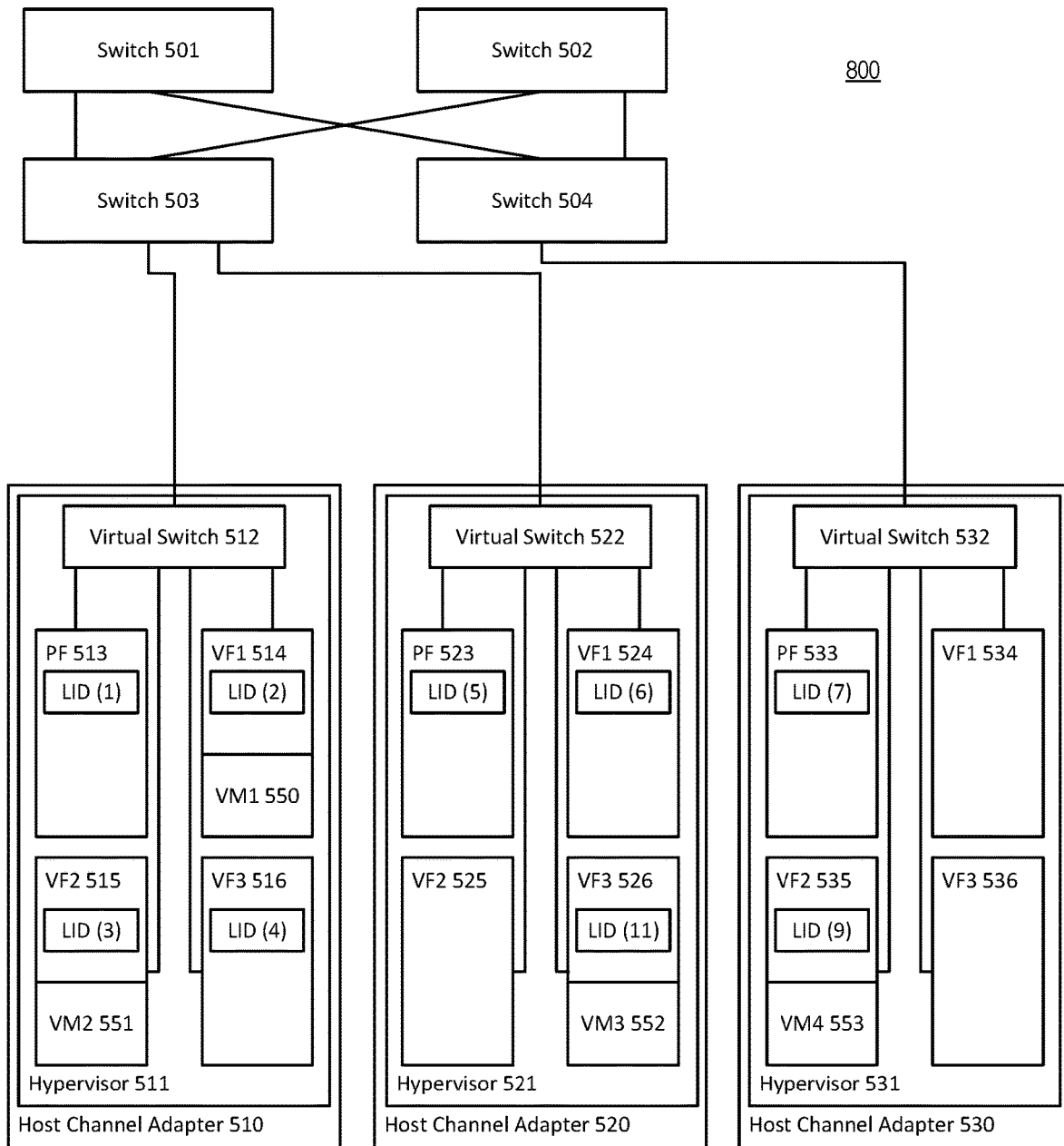
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LI Ds. Referring to FIG. 9, hypervisor 511 can be arranged with vSwitch with prepopulated LI Ds architecture, while hypervisor 521 can be arranged with vSwitch with prepopulated LI Ds and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3

552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs <=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
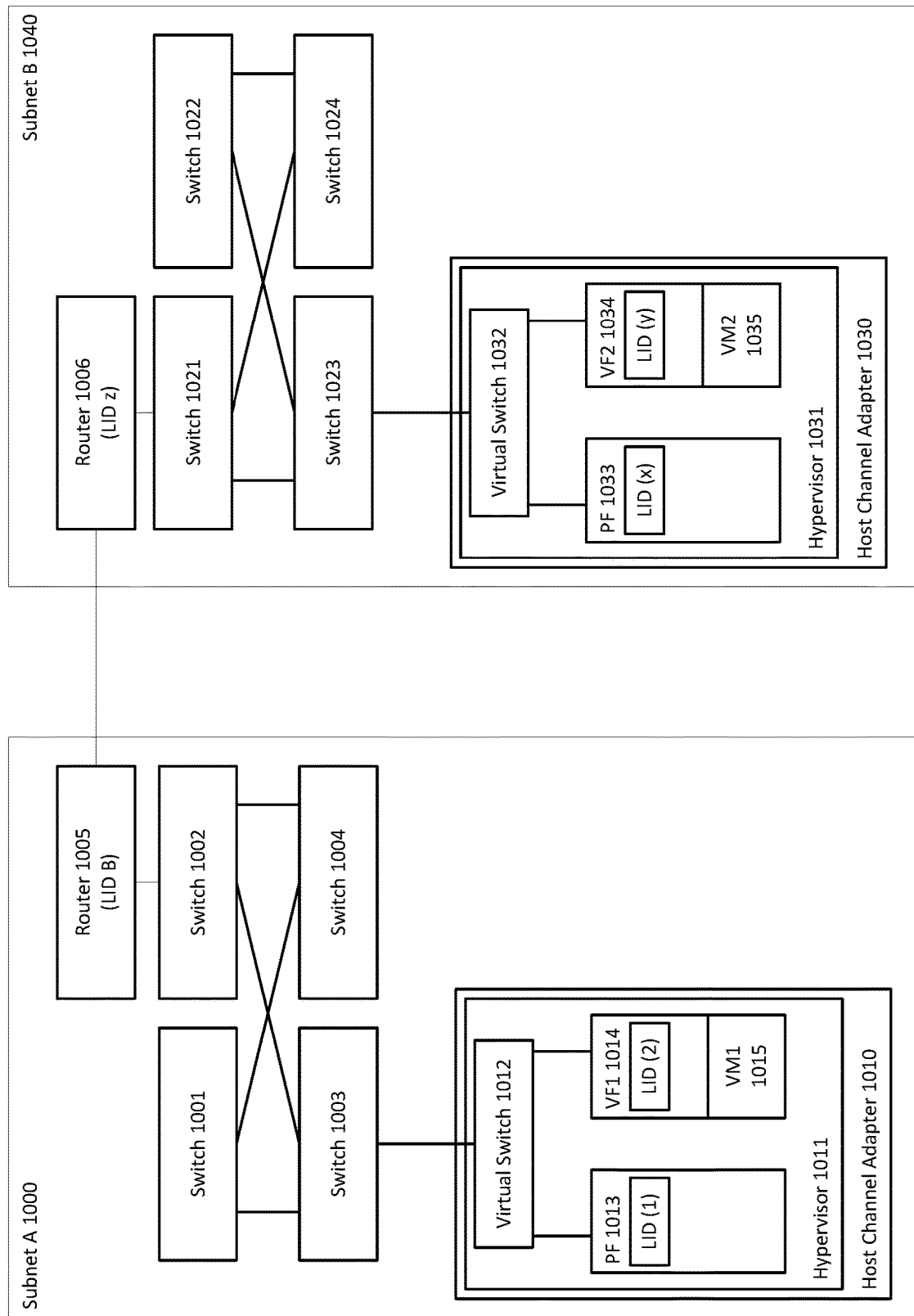
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapters 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 10105 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapters 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, created a fabric profile (e.g., a virtual machine fabric profile), build a virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination at a different subnet, such as virtual machine 2 within subnet B, the traffic can be addressed to the router within subnet A, i.e., router 1005, which can then pass the traffic to subnet B via its link with router 1006.

Scalable Bitmap Based P_Key Table

In accordance with an embodiment, because of the expanded InfiniBand networks provided with the use of virtual machines, the number of possible partitions within has increased dramatically. However, with the current method for handling P_Key administration and routing, significant overhead time is added as traffic traverses the fabric. Traditionally, the InfiniBand specification defines a P_Key table as an array of 16 bit P_Key values that the SM can access as an indexed table. A hardware implementation of this specification implies the use of associative memory to perform lookup to perform partition checking of IB packets at wire-speed packet rate. Practically, this limits the possible size of a hardware implemented P_Key table to be orders of magnitude smaller that the 64K value space that the 16 bit P_Key value represents.

In accordance with an embodiment, the InfiniBand specification defines partition membership via a 16 bit P_Key, and enforces partition isolation through the use of a fixed table of P_Key values at each port within the fabric. The Subnet Manager can program different P_Key values in different table entries. When a packet, marked in its header with a P_Key based upon its partition association, arrives at a port, the underlying hardware can compare the incoming packet with all the values in the P_Key table associated with the checking hardware (i.e., performing an associative lookup at the table). However, this lookup does not scale well with a large number of partitions and can introduce unwanted overhead while performing lookups on a number of partitions within the table.

Figure 11:
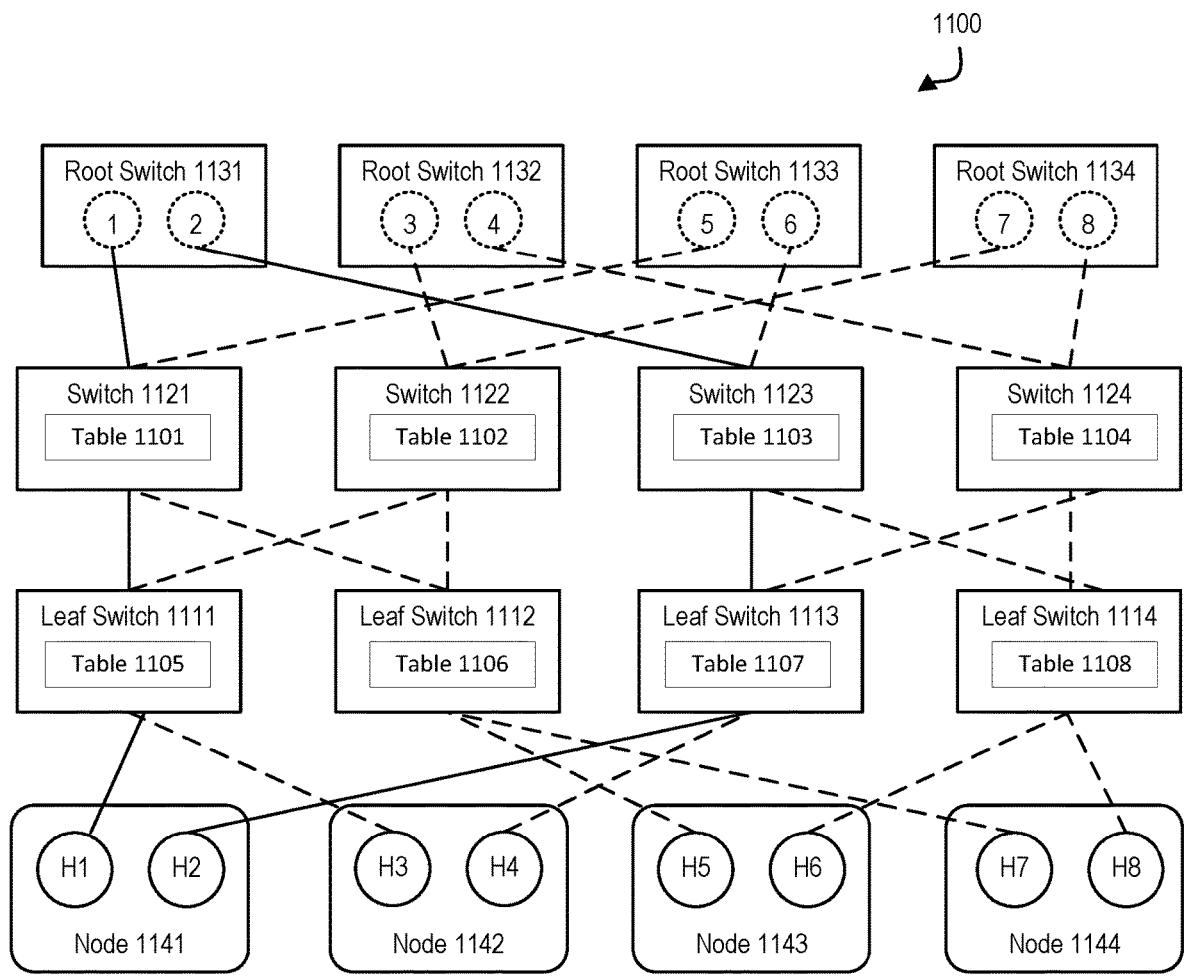
FIG. 11 shows an exemplary InfiniBand fabric with an associative table for partition isolation, in accordance with an embodiment.

FIG. 11 shows an exemplary InfiniBand fabric with an associative table for partition isolation, in accordance with an embodiment. As shown in FIG. 11, one or more end nodes 1141-1144 can be connected in a network fabric 1100. The network fabric 1100 can be based on a fat-tree topology, which includes a plurality of leaf switches 1111-1114, and multiple spine switches or root switches 1131-1134. Additionally, the network fabric 1100 can include one or more intermediate switches, such as switches 1121-1124. Also as shown in FIG. 11, each of the end nodes 1141-1144 can be a multi-homed node.

In accordance with an embodiment, each of the nodes 1141-1144 can belong to one or more of a number of partitions, where each partition is associated with a P_Key value. As described above, the P_Key value can be included in each packet sent within the fabric, and can allow for varying degrees of partition enforcement within the subnet. Each of the P_Key values are stored in a number of tables, for example tables 1101-1108 (also referred to herein as "port P_Key table"), where each table is associated with, for example, a port of a switch or another member of the fabric, such as a node. Each table 1101-1108 can be set by the subnet manager.

In accordance with an embodiment, each port P_Key table can comprise an array of N entries where each entry can contain one or more (i.e., a plurality) 16 bit P_Key values, and the value of N is a capability of the port (retrieved by the SM as part of discovering the status and capabilities of the port). When the SM has policy information that implies that a port should be member of a partition (i.e., full or limited), the SM can find the next available entry in the port P_Key table and then store the relevant 16 bit P_Key value in that entry. Once a P_Key value has been successfully stored (confirmed by the SMA to the SM), the SM can expect the port hardware to include matching of the new P_Key table entry for all packets going through the port, and packets with packet P_Key value matching the new value in the updated P_Key table entry can be accepted (i.e., passed through the port).

In accordance with an embodiment, when a port in a subnet is no longer supposed to be a member of a partition, the SM can clear (write zero to) the relevant P_Key table entry. Once the P_Key value has been successfully cleared (confirmed by the SMA to the SM), the SM can expect the port hardware to fail P_Key matching for all packets going through the port with a packet P_Key value corresponding to the one that was just cleared from the port P_Key table, and then drop the packet.

In accordance with an embodiment, the SM can replace a valid P_Key table entry with a new value without clearing the existing value first. The expected effect in this case is the same as if the entry contents had first been cleared and then subsequently updated with the new value.

As already described, the embodiment depicted in FIG. 11 can scale well within the confines of a subnet without a large number of partitions. However, once a large number of partitions are present within any given subnet, such as, for example, a subnet utilizing a virtualization of end nodes and one or more vSwitch architectures, the associative table lookup described above can lead to a large increase in overhead time and may not even be possible to implement in hardware if the relevant link speed requirements defined by the IB specification is to be fulfilled.

In accordance with an embodiment, instead of utilizing a P_Key table associated with each port in the IB fabric, exemplary methods and systems can instead utilize a bitmap to implement in hardware a representation of all possible P_Key values—16 bit (i.e., 64 k possible values). In such methods and systems, within a hardware implementation, each possible P_Key value can be represented as a single bit, where the value of the single bit (e.g., 1 or 0) can define whether the P_Key value is allowed (i.e., the packet is allowed to pass through the port performing the partition check) or not allowed (i.e., the packet is dropped at the port performing the partition check).

Figure 12:
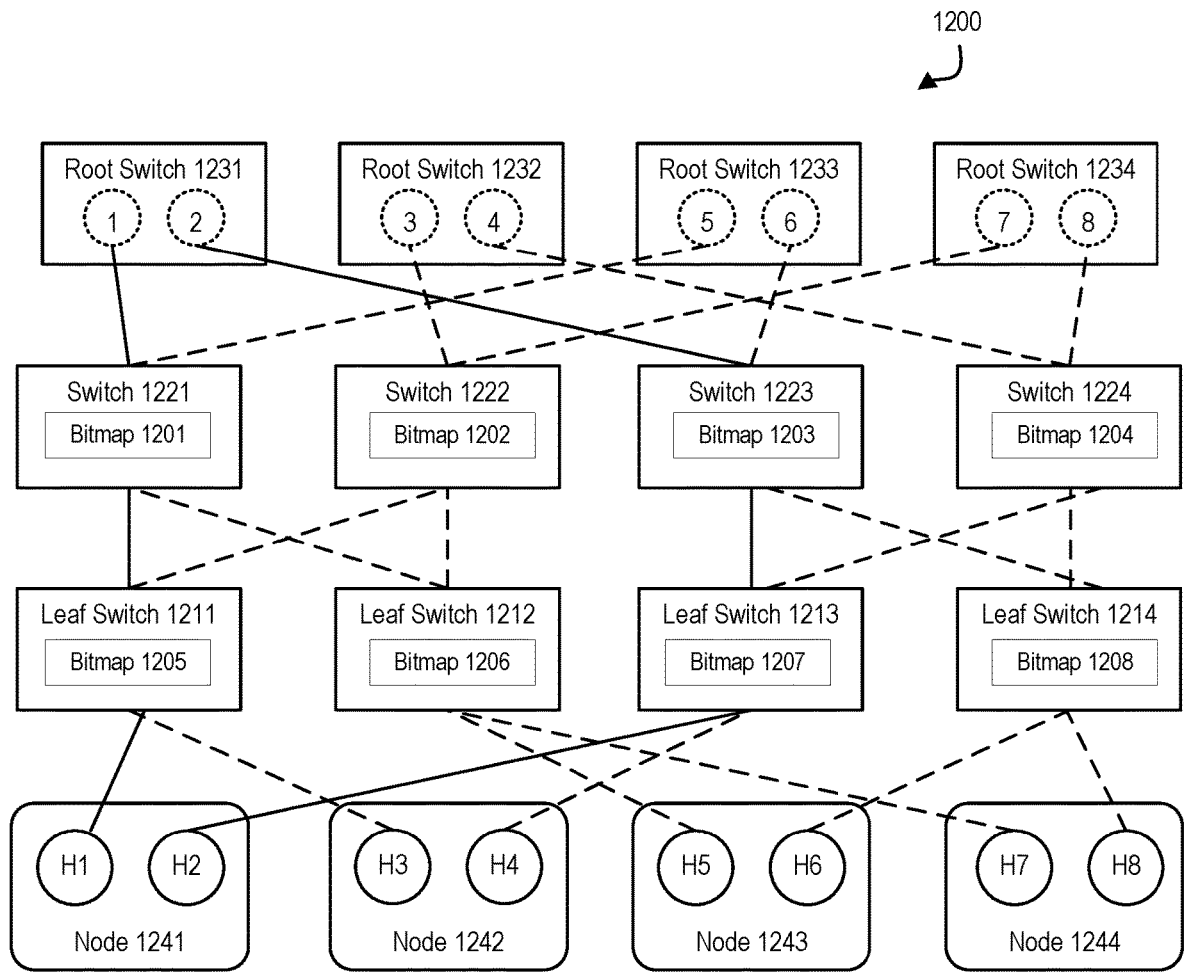
FIG. 12 shows an exemplary InfiniBand fabric with bitmap for partition isolation, in accordance with an embodiment.

FIG. 12 shows an exemplary InfiniBand fabric with bitmap for partition isolation, in accordance with an embodiment. As shown in FIG. 12, one or more end nodes 1241-1244 can be connected in a network fabric 1200. The network fabric 1200 can be based on a fat-tree topology, which includes a plurality of leaf switches 1211-1214, and multiple spine switches or root switches 1231-1234. Additionally, the network fabric 1200 can include one or more intermediate switches, such as switches 1221-1224. Also as shown in FIG. 12, each of the end nodes 1241-1244 can be a multi-homed node.

In accordance with an embodiment, each of the nodes 1241-1244 can belong to one of a number of partitions, where each partition is associated with a P_Key value. As described above, the P_Key value can be included in each packet sent within the fabric, and can allow for varying degrees of partition enforcement within the subnet. Each of the P_Key values can be referenced in a number of bitmaps, such as bitmaps 1201-1208, where each bitmap is associated with, for example, a port of a switch or another member of the fabric, such as a node. Each bitmap 1201-1208 can be set by the subnet manager.

In accordance with an embodiment, by representing the P_Keys in a bitmap instead of an associative table lookup, this can allow for greater flexibility and decreased overhead time for partition isolation and packet routing in the fabric. Any node can be a member of any partition. This can allow any switch port to only allow P_Keys that the SM has configured to be allowed through that switch port (otherwise the packets can be dropped). By utilizing a bit-map based P_Key table, the methods and systems can allow just a few partitions or several hundred to be allowed. Such methods and systems can ensure that only those partitions that are supposed to pass through a switch are allowed. Such methods and systems can allow for greater partition isolation, even with a larger number of partitions available.

In accordance with an embodiment, by using a bitmap scheme, instead of having an associative lookup of P_Key values, the hardware can take the P_Key value from the packet header, and instead of sending value into associative lookup mechanism, it instead takes the P_Key value and indexes it into a bit array (e.g., of 64K bits). If a return value is an "allowed" (i.e., passed) value, then the packet can be passed on by the port/hardware performing the check. If the return value is a "not allowed" (i.e., failed) value, the packet can be refused and dropped. This can, for example, lead to impede scaling (i.e., allowing a greater number of partition P_Keys without loss of performance).

In accordance with an embodiment, the bitmap scheme described above can, in addition to enforcing partition isolation at end nodes, additionally support partition enforcement at intermediate switches, such as at a first leaf switch, any switch between the first leaf switch and a root switch, and at a last leaf switch. Switch to switch links are used by many different nodes, depending the routing of the fabric. In traditional systems, partition enforcement was primarily used on end nodes, and it may have been enforced at a last leaf switch, but not switches at levels higher than leaf switches (i.e., partition enforcement was not used on links between switches). However, with the speed and efficiency gained by using a partition bitmap associated with allowed and not allowed P_Keys, partition enforcement can take place at these intermediate links. By ensuring that each switch port only allows partitions that are allowed to be sent across that port, then such a packet that encounters a port it is not allowed to pass at an intermediate link could be dropped much sooner (instead of at the end node or at the leaf switch), which leads to improved performance.

In accordance with an embodiment, the SM can determine and set, at the bitmaps, which traffic is allowed to be routed where in the complete fabric, depending on partition. The SM can then set up partition enforcement using the bitmap. The SM can receive policy configuration about which end nodes are members of what partition. Based on this policy information, the SM can set up partition enforcement on the end nodes (via bitmap). The SM can also configure switch to switch connectivity. Having done this, the SM can then restrict, using the bitmap, traffic flow in the fabric. SM sets values per partition in the bitmap to 1 or 0, pass or drop (i.e., allowed or not allowed). This ensures that non-allowed traffic can be dropped early on in the traffic's routing, instead of at the destination node or the last leaf switch before the destination node.

In accordance with an embodiment, each of the bitmaps can be a bit array comprising a 64K bit array for P_Key enforcement for each port. Such a bitmap can be associated with any kind of IB port: A switch external port, a switch management port (i.e., switch port 0), a TCA port (e.g. for an IB-Ethernet bridge/gateway node implementation), a HCA port as well as a router port. The bit array can be indexed by P_Key value and a bit value of one implies that data packets with packet P_Key value corresponding to the bit array index should be accepted. A value of zero can imply that data packets with P_Key values corresponding to the bit array index should be rejected and dropped.

In accordance with an embodiment, a single partition number can be associated with two bit array indexes—one that represents limited membership and one that represents full membership. Hence, depending on whether the port is supposed to only allow full membership traffic or both full and limited membership traffic, only the full member index or both the full and limited member index has to be set up to allow the corresponding membership traffic. However, due to fact that a limited partition member is not allowed to communicate with another limited member whereas a full member is allowed to communicate with both full members and limited members, the lookup implementation must take this into account so that an end-node that is initiating a packet is only allowed to send limited member packets when it is only a limited member of the partition, but that it correspondingly will only be allowed to receive full member packets.

Figure 13:
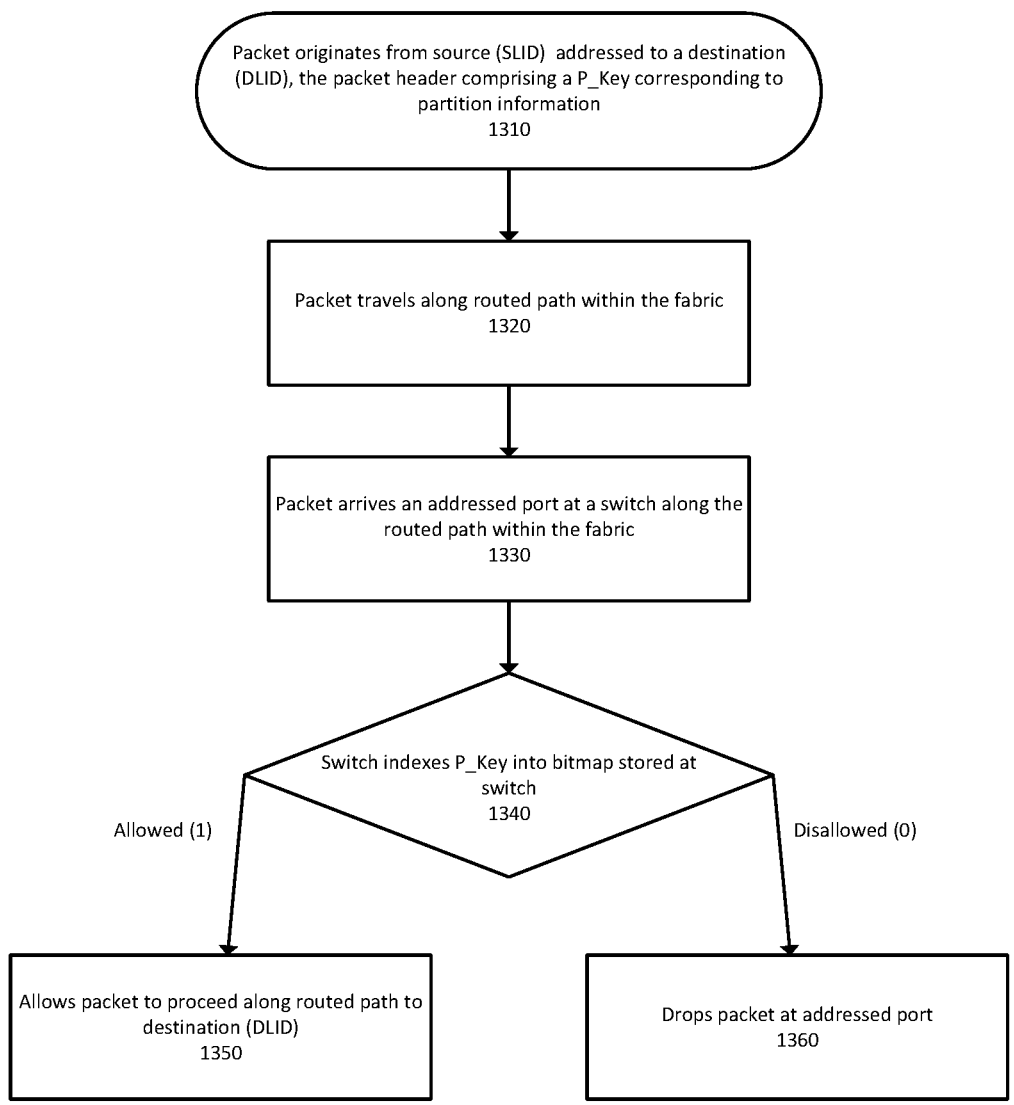
FIG. 13 is a flowchart for a method for supporting scalable bitmap based P_Key table in a high performance computing environment, in accordance with an embodiment.

FIG. 13 is a flowchart for a method for supporting scalable bitmap based P_Key table in a high performance computing environment, in accordance with an embodiment.

At step 1310, a packet can originate from a source (e.g., a source node or a source virtual machine) and be addressed to a destination (e.g., a destination node ora destination virtual machine). The packet can contain a header, which can include, among other information, a P_Key value corresponding to partition information, such as a common partition between the source and the destination.

At step 1320, the packet can begin traversing a fabric, such as an InfiniBand fabric, along a calculated route. The route can be calculated, for example, by a subnet manager.

At step 1330, the packet can arrive at an addressed port of a switch along the routed path within the fabric.

At step 1340, the switch at which the addressed port is located can index the P_Key into a bitmap stored at the switch.

At step 1350, if a result of the indexing is an "allowed" (e.g., a "1"), this allows the packet to proceed along the routed path to the destination (DLID).

At step 1360, if a result of the indexing is a "disallowed" (e.g., a "0"), the switch can drop the packet at the addressed port and not allow the packet to proceed along the routed path.

It should be understood that although the embodiment shown in FIG. 13 and described above discloses the indexing of the P_Key at only one switch within the fabric, each switch and node along the routed path can perform indexing the P_Key into associated bitmaps at each addressed port to determine if the packet is allowed or disallowed.

Figure 14:
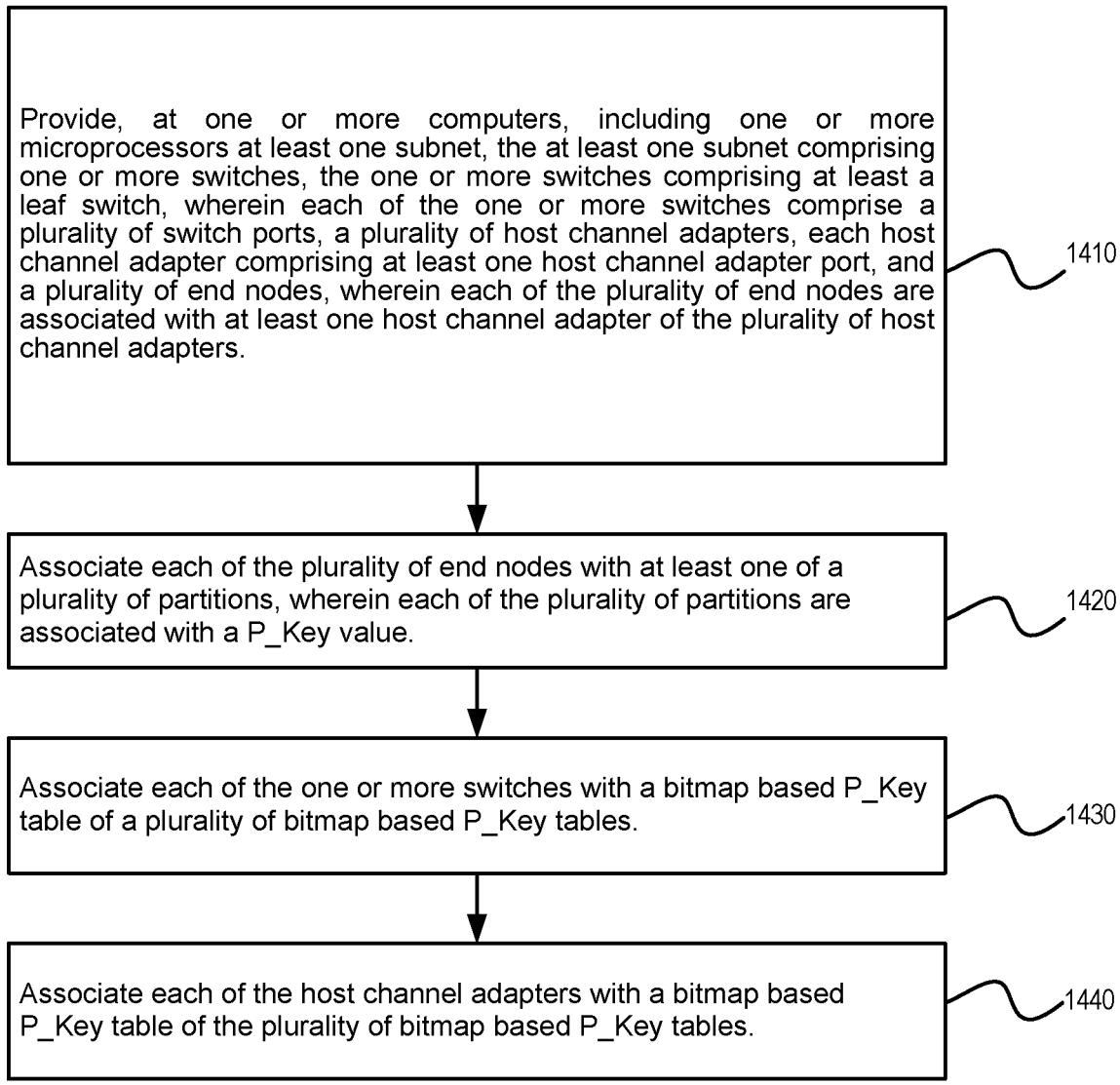
FIG. 14 is a flowchart for a method for supporting scalable bitmap based P_Key table in a high performance computing environment, in accordance with an embodiment.

FIG. 14 is a flowchart for a method for supporting scalable bitmap based P_Key table in a high performance computing environment, in accordance with an embodiment. At step 1410, the method can provide, at one or more computers, including one or more microprocessors at least one subnet, the at least one subnet comprising one or more switches, the one or more switches comprising at least a leaf switch, wherein each of the one or more switches comprise a plurality of switch ports, a plurality of host channel adapters, each host channel adapter comprising at least one host channel adapter port, and a plurality of end nodes, wherein each of the plurality of end nodes are associated with at least one host channel adapter of the plurality of host channel adapters.

At step 1420, the method can associate each of the plurality of physical hosts and virtual machines with at least one of a plurality of partitions, wherein each of the plurality of partitions are associated with a P_Key value.

At step 1430, the method can associate each of the switch ports with a bitmap based P_Key table of a plurality of bitmap based P_Key tables.

At step 1440, the method can associate each of the host channel adapter ports with a bitmap based P_Key table of the plurality of bitmap based P_Key tables.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting a bitmap based P_Key table in a high performance computing environment, comprising:
   one or more microprocessors;
   at least one subnet, the at least one subnet comprising
      a plurality of switches, the plurality of switches being arranged in a plurality of levels comprising at least a leaf switch level, an intermediate switch level, and a root switch level, wherein each of the plurality of switches comprises a plurality of switch ports,
      a plurality of host channel adapters, each host channel adapter comprising at least one host channel adapter port of a plurality of host channel adapter ports, and
      a plurality of end nodes, wherein each of the plurality of end nodes is associated with at least one host channel adapter of the plurality of host channel adapters;
   wherein each of the plurality of end nodes is associated with at least one of a plurality of partitions;
   wherein each of the plurality of partitions is associated with a P_Key value of a plurality of P_Key values;
   wherein each switch port of the plurality of switch ports is associated with at least one bitmap of a plurality of bitmaps, each respective bitmap being stored in a memory of each respective switch, wherein each bitmap comprises an array comprising a mapping of a representation of each of the plurality of P_Key values to a corresponding bit of a plurality of bits of the array, each bit corresponding to a value of allowed or disallowed;
   wherein upon a switch port of a switch at non-leaf level receiving a packet from a sending end node, the packet comprising a header comprising a destination local identifier (DLID) of a receiving end node and a P_Key value indicating the sending end node belongs to a partition being associated with the P_Key, the sending end node being a full member of the partition and the receiving end node being a limited member of the partition, the at least one bitmap is indexed by the P_Key value of the header of the received packet to determine an allowed value for the received packet; and
   wherein upon the switch port receiving another packet from another sending end node, the another packet comprising a header comprising the DLID of the receiving end node and the P_Key value indicating the another sending end node belongs to the same partition being associated with the P_Key, the another sending end node being a limited member of the partition, the at least one bitmap is indexed by the P_Key value of the header of the received another packet to determine a disallowed value for the another received packet.

2. The system of claim 1, further comprising:
   a subnet manager, the subnet manager running on one of the plurality of switches or one of the plurality of host channel adapters;
   wherein the subnet manager determines allowed and disallowed traffic through the plurality of ports on each of the one or more switches.

3. The system of claim 2,
   wherein the subnet manager configures each of the plurality of bitmaps based upon the determination of allowed and disallowed traffic through each of the plurality of ports on each of the one or more switches.

4. The system of claim 1
   wherein a host channel adapter port of the plurality of host channel adapter ports is associated with at least another bitmap of the plurality of bitmaps, wherein the at least another bitmap comprises an array comprising a mapping of a representation of each of the plurality of P_Key values to a value of allowed or disallowed.

5. The system of claim 4, wherein upon receiving an allowed value, the switch allows the packet to pass through the addressed port.

6. The system of claim 4, wherein upon receiving a disallowed value, the switch drops the packet at the addressed port.

7. The system of claim 1, wherein the one or more subnets comprise two or more subnets, each of the two or more subnets being interconnected by at least one router in each of the two or more subnets.

8. A method for supporting a bitmap based P_Key table in a high performance computing environment, comprising:
   providing, at one or more computers, including one or more microprocessors,
   at least one subnet, the at least one subnet comprising
      a plurality of switches, the plurality of switches being arranged in a plurality of levels comprising at least a leaf switch level, an intermediate switch level, and a root switch level, wherein each of the plurality of switches comprises a plurality of switch port, a plurality of host channel adapters, each host channel adapter comprising at least one host channel adapter port of a plurality of host channel adapter ports, and a plurality of end nodes, wherein each of the plurality of end nodes is associated with at least one host channel adapter of the plurality of host channel adapters;

associating each of the plurality of end nodes with at least one of a plurality of partitions, wherein each of the plurality of partitions is associated with a P_Key value of a plurality of P_Key values;

associating each switch port of the plurality of switch ports with at least one bitmap of a plurality of bitmaps, each respective bitmap being stored in a memory of each respective switch, wherein each bitmap comprises an array comprising a mapping of a representation of each of the plurality of P_Key values to a corresponding bit of a plurality of bits of the array, each bit corresponding to a value of allowed or disallowed;

upon a switch port of a switch at non-leaf level receiving a packet from a sending end node, the packet comprising a header comprising a destination local identifier (DLID) of a receiving end node and a P_Key value indicating the sending end node belongs to a partition being associated with the P_Key, the sending end node being a full member of the partition and the receiving end node being a limited member of the partition, indexing the at least one bitmap bar the P_Key value of the header of the received packet to determine an allowed disallowed value for the received packet; and upon the switch port receiving another packet from another sending end node, the another packet comprising a header comprising the DLID of the receiving end node and the P_Key value indicating the another sending end node belongs to the same partition being associated with the P_Key, the another sending end node being a limited member of the partition, indexing the at least one bitmap by the P_Key value of the header of the received another packet to determine a disallowed value for the another received packet.

9. The method of claim 8, further comprising:

further providing, at the one or more computers, including the one or more microprocessors, a subnet manager, the subnet manager running on one of the plurality of switches or one of the plurality of host channel adapters; and determining, by the subnet manager, allowed and disallowed traffic through the plurality of ports on each of the one or more switches.

10. The method of claim 9 further comprising, configuring, by the subnet manager, each of the plurality of bitmap based upon the determination of allowed and disallowed traffic through each of the plurality of ports on each of the one or more switches.

11. The method of claim 8, further comprising:

associating a host channel adapter port of the plurality of host channel adapter ports with at least another bitmap of the plurality of bitmaps, wherein the at least another bitmap comprises an array comprising a mapping of a representation of each of the plurality of P_Key values to a value of allowed or disallowed.

12. The method of claim 11, further comprising:

upon receiving an allowed value, allowing, by the switch, the packet to pass through the addressed port.

13. The method of claim 11, further comprising:

upon receiving a disallowed value, dropping, by the switch, the packet at the addressed port.

14. The method of claim 8, wherein the one or more subnets comprise two or more subnets, each of the two or more subnets being interconnected by at least one router in each of the two or more subnets.

15. A non-transitory computer readable storage medium, including instructions stored thereon for supporting a bitmap based P_Key table in a high performance computing environment, which when read and executed by one or more computers cause the one or more computers to perform steps comprising:

providing, at one or more computers, including one or more microprocessors, at least one subnet, the at least one subnet comprising a plurality of switches, the plurality of switches being arranged in a plurality of levels comprising at least a leaf switch level, an intermediate switch level, and a root switch level, wherein each of the plurality of switches comprise a plurality of switch ports, a plurality of host channel adapters, each host channel adapter comprising at least one host channel adapter port of a plurality of host channel adapter ports, and a plurality of end nodes, wherein each of the plurality of end nodes is associated with at least one host channel adapter of the plurality of host channel adapters;

associating each of the plurality of end nodes with at least one of a plurality of partitions, wherein each of the plurality of partitions is associated with a P_Key value of a plurality of P_Key values;

associating each switch port of the plurality of switch ports with at least one bitmap of a plurality of bitmaps, each respective bitmap being stored in a memory of each respective switch, wherein each bitmap comprises an array comprising a mapping of a representation of each of the plurality of P_Key values to a corresponding bit of a plurality of bits of the array, each bit corresponding to a value of allowed or disallowed;

upon a switch port of a switch at non-leaf level receiving a packet from a sending end node, the packet comprising a header comprising a destination local identifier (DLID) of a receiving end node and a P_Key value indicating the sending end node belongs to a partition being associated with the P_Key, the sending end node being a full member of the partition and the receiving end node being a limited member of the partition, indexing the at least one bitmap by the P_Key value of the header of the received packet to determine an allowed value for the received packet; and upon the switch port receiving another packet from another sending end node, the another packet comprising a header comprising the DLID of the receiving end node and the P_Key value indicating the another sending end node belongs to the same partition being associated with the P_Key, the another sending end node being a limited member of the partition, indexing the at least one bitmap by the P_Key value of the header of the received another packet to determine a disallowed value for the another received packet.

16. The non-transitory computer readable storage medium of claim 15, the steps further comprising:

further providing, at the one or more computers, including the one or more microprocessors, a subnet manager, the subnet manager running on one of the plurality of switches or one of the plurality of host channel adapters; and determining, by the subnet manager, allowed and disallowed traffic through the plurality of ports on each of the one or more switches.

17. The non-transitory computer readable storage medium of claim 16, the steps further comprising, configuring, by the subnet manager, each of the plurality of bitmap based upon the determination of allowed and disallowed traffic through each of the plurality of ports on each of the one or more switches.

18. The non-transitory computer readable storage medium of claim 15, the steps further comprising:

associating a host channel adapter port of the plurality of host channel adapter ports with at least another bitmap of the plurality of bitmaps, wherein the at least another bitmap comprises an array comprising a mapping of a representation of each of the plurality of P_Key values to a value of allowed or disallowed.

19. The non-transitory computer readable storage medium of claim 18, the steps further comprising:

upon receiving an allowed value, allowing, by the switch, the packet to pass through the addressed port.

20. The non-transitory computer readable storage medium of claim 18, the steps further comprising:

upon receiving a disallowed value, dropping, by the switch, the packet at the addressed port.

* * * * *

UNITED STATES PATENT AND TRADEMARK OFFICE
CERTIFICATE OF CORRECTION

PATENT NO. : 11,271,870 B2
APPLICATION NO. : 15/412972
DATED : March 8, 2022
INVENTOR(S) : Johnsen et al.

Page 1 of 2

It is certified that error appears in the above-identified patent and that said Letters Patent is hereby corrected as shown below:

In the Specification

In Column 1, Line 10, delete "SCALALBE" and insert -- SCALABLE --, therefor.

In Column 2, Line 12, delete "embodiment" and insert -- embodiment. --, therefor.

In Column 5, Line 27, delete "Wth" and insert -- With --, therefor.

In Column 6, Line 44, delete "Topolodies" and insert -- Topologies --, therefor.

In Column 6, Line 44, delete "Routind" and insert -- Routing --, therefor.

In Column 7, Line 67, delete "Wth" and insert -- With --, therefor.

In Column 10, Line 38, delete "Wth" and insert -- With --, therefor.

In Column 11, Lines 28-29, delete "LI Ds" and insert -- LIDs --, therefor.

In Column 11, Line 56, delete "PF" and insert -- PF. --, therefor.

In Column 14, Line 54, delete "LI Ds." and insert -- LIDs. --, therefor.

In Column 14, Line 55, delete "LI Ds" and insert -- LIDs --, therefor.

In Column 14, Line 57, delete "LI Ds" and insert -- LIDs --, therefor.

In Column 19, Line 55, delete "ora" and insert -- or a --, therefor.

Signed and Sealed this
Twenty-first Day of February, 2023

Katherine Kelly Vidal
*Director of the United States Patent and Trademark Office*

CERTIFICATE OF CORRECTION (continued)
U.S. Pat. No. 11,271,870 B2

In the Claims

In Column 22, Line 67, in Claim 8, delete "port," and insert -- ports, --, therefor.

In Column 23, Line 28, in Claim 8, delete "bar" and insert -- by --, therefor.

In Column 23, Line 30, in Claim 8, delete "disallowed value" and insert -- value --, therefor.